(12) United States Patent
Zhang et al.

(10) Patent No.: US 8,281,564 B2
(45) Date of Patent: Oct. 9, 2012

(54) HEAT TRANSFER TUBES HAVING DIMPLES ARRANGED BETWEEN ADJACENT FINS

(75) Inventors: Hua Zhang, Greer, SC (US); Sal Albert Leone, Scotia, NY (US); Thomas Francis Taylor, Greenville, SC (US)

(73) Assignee: General Electric Company, Schenectady, NY (US)

( * ) Notice: Subject to any disclaimer, the term of this patent is extended or adjusted under 35 U.S.C. 154(b) by 931 days.

(21) Appl. No.: 12/358,804

(22) Filed: Jan. 23, 2009

(65) Prior Publication Data

US 2010/0186443 A1     Jul. 29, 2010

(51) Int. Cl.
| | |
|---|---|
| F02C 6/00 | (2006.01) |
| F02G 1/00 | (2006.01) |
| F02G 3/00 | (2006.01) |
| F01K 23/06 | (2006.01) |
| F22B 23/06 | (2006.01) |
| F22B 37/10 | (2006.01) |
| F28D 1/04 | (2006.01) |

(52) U.S. Cl. .................. 60/39.182; 60/670; 122/367.3; 165/151

(58) Field of Classification Search ............. 60/39.182, 60/670; 122/367.1, 367.3, 235.14, DIG. 13; 165/151, 167
See application file for complete search history.

(56) References Cited

U.S. PATENT DOCUMENTS

| | | | | |
|---|---|---|---|---|
| 3,965,675 A | * | 6/1976 | Martz et al. | 60/39.182 |
| 5,337,807 A | * | 8/1994 | Ryan | 165/146 |
| 5,797,448 A | * | 8/1998 | Hughes et al. | 165/151 |
| 5,873,238 A | * | 2/1999 | Bellows | 60/39.182 |
| 6,527,654 B2 | | 3/2003 | Sajima | |
| 6,846,575 B2 | | 1/2005 | Hasz et al. | |
| 6,910,620 B2 | | 6/2005 | Hasz et al. | |
| 7,005,866 B2 | * | 2/2006 | Schroeder | 324/691 |
| 7,114,916 B2 | | 10/2006 | Dube et al. | |
| 7,357,100 B2 | | 4/2008 | Waseda et al. | |

FOREIGN PATENT DOCUMENTS

| | | |
|---|---|---|
| DE | 221024 C | 4/1910 |
| DE | 1526921 A1 | 3/1970 |
| EP | 0838650 A2 | 4/1998 |
| FR | 402483 A | 10/1909 |
| GB | 191117494 A | 0/1912 |
| WO | 03052319 A1 | 6/2003 |

OTHER PUBLICATIONS

Extended European Search Report for EP Application No. 10151273.9-2321, dated Apr. 24, 2012, pp. 1-7.

* cited by examiner

*Primary Examiner* — William H Rodriguez
*Assistant Examiner* — Carlos A Rivera
(74) *Attorney, Agent, or Firm* — Cantor Colburn LLP

(57) ABSTRACT

A combined cycle power plant includes a first generator driven by a gas turbine for generating electricity. The combined cycle power plant further includes a heat recovery steam generator disposed to receive exhaust gas from the gas turbine. The heat recovery steam generator includes an evaporator having tubes receptive to water flow therethrough. The tubes are disposed to be exposed to the exhaust gas, such that a flow of the exhaust gas passes around the tubes transfers heat from the exhaust gas to the tubes and thereby the water flowing through the tubes sufficient for the water to evaporate into steam. The tubes each having an outer surface with a plurality of deformations formed therein sufficient to introduce turbulence in the flow of the exhaust gas for enhancing heat transfer from the exhaust gas to the tubes.

4 Claims, 5 Drawing Sheets

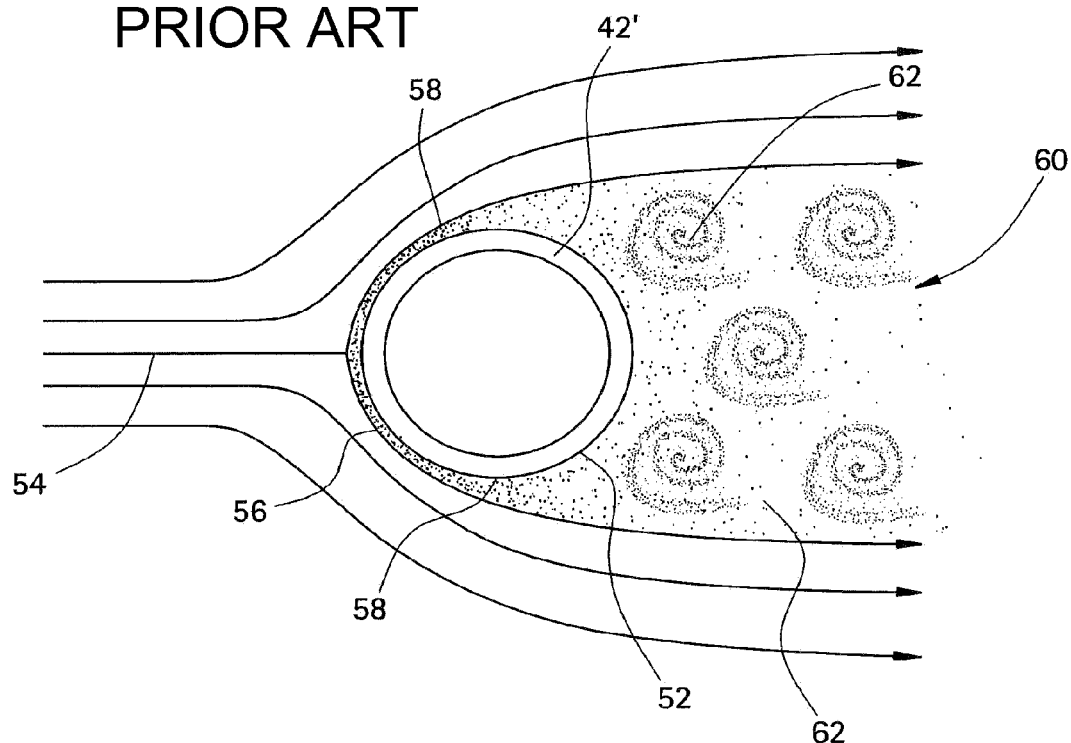
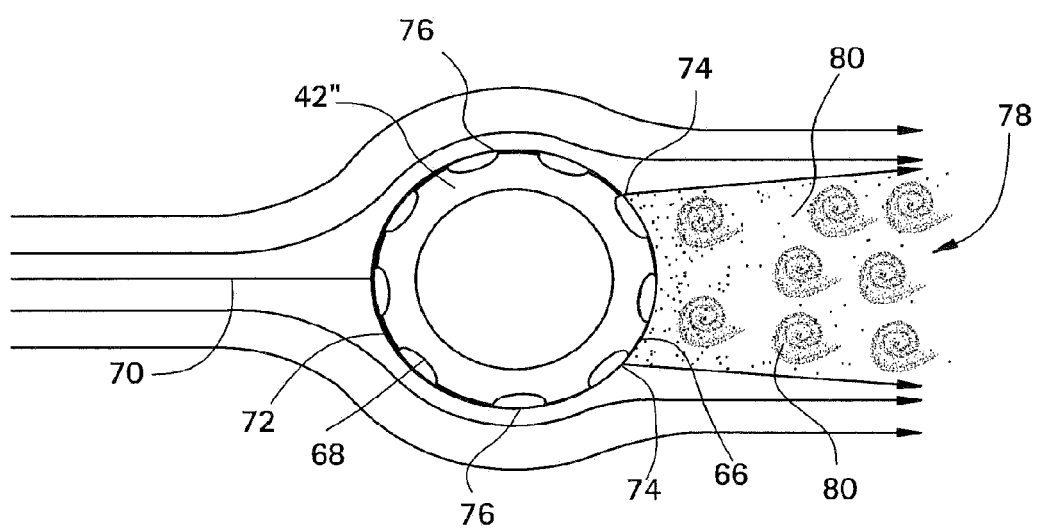

Velocity
(Vector 1)

3.333e+001

2.500e+001

1.667e+001

8.333e+000

0.000e+000

[ft s^-1]

Smooth tube wall

Velocity
(Vector 1)

1.054e+001

7.905e+000

5.270e+000

2.635e+000

0.000e+000

[m s^-1]

Rough tube wall: 0.06"

HEAT TRANSFER TUBES HAVING DIMPLES ARRANGED BETWEEN ADJACENT FINS

BACKGROUND OF THE INVENTION

This invention relates generally to improved heat transfer by heat transfer tubes in a heat recovery steam generator of a combined cycle power plant. More particularly, this invention relates to deformations in the outer surface of the heat transfer tubes to enhance heat transfer within a heat recovery steam generator, while also decreasing pressure drop within the heat recovery steam generator.

Combined cycle power plants include a heat recovery steam generator for recovering heat from the exhaust of a gas turbine to generate heat for powering a steam turbine, as is known. The heat recovery steam generator currently utilizes a plurality of tubes that transfer thermal energy from the gas turbine exhaust to water/steam inside the tubes thereby generating steam or boosting steam temperature. The tubes have solid serrated fins to promote heat transfer. Water/steam within the tubes is heated by the passing exhaust gases to generate steam or super heated steam for powering the steam turbine of the combined cycle power plant. However, a pressure drop occurs on the air side of the heat recovery steam generator, which adversely impacts performance of gas turbines. Increasing the number of fins to improve heat transfer at the tubes, may result in an undesirable increase in the pressure drop. This is because the fins seek to enhance heat transfer by simply increasing surface area, which results in increased drag, therefore, pressure drop increase. Most of the improvement in heat transfer coefficient using fins is undermined by the increased pressure drop. For example, with serrated fins that result in an increase in the heat transfer coefficient of 10%, the cost of the pressure drop is 25%.

The heat recovery steam generator is a significant portion of the overall cost of the combined cycle power plant. By improving heat transfer efficiency within the heat recovery steam generator, the combined cycle power plant cost can be reduced.

BRIEF DESCRIPTION OF THE INVENTION

According to one aspect of the invention, an evaporator of a heat recovery steam generator includes at least one tube. The at least one tube has an outer surface with a plurality of deformations formed therein sufficient to introduce turbulence in a flow of a gas around the at least one tube for enhancing heat transfer from the gas to the at least one tube.

According to another aspect of the invention, a construction method for an evaporator having at least one tube of a heat recovery steam generator includes forming a plurality of deformations in an outer surface of the at least one tube sufficient to introduce turbulence in a flow of a gas around the at least one tube for enhancing heat transfer from the gas to the at least one tube.

According to yet another aspect of the invention, a combined cycle power plant includes a first generator driven by a gas turbine for generating electricity. During operation of the gas turbine exhaust gas is generated. The combined cycle power plant further includes a heat recovery steam generator disposed to receive the exhaust gas from the gas turbine. The heat recovery steam generator includes an evaporator having at least one tube receptive to water flow there through. The at least one tube is disposed to be exposed to the exhaust gas, such that a flow of the exhaust gas passes around the at least one tube transfers heat from the exhaust gas to the at least one tube and thereby the water flowing through the at least one tube sufficient for the water to evaporate into steam. The at least one tube having an outer surface with a plurality of deformations formed therein sufficient to introduce turbulence in the flow of the exhaust gas for enhancing heat transfer from the exhaust gas to the at least one tube. The combined cycle power plant also includes a second generator driven by a steam turbine for generating electricity. The steam turbine is receptive to the steam from the heat recovery steam generator for driving the steam turbine.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3 is a diagrammatic cross-sectional view of a tube illustrating airflow thereabout in accordance with the prior art;

FIG. 4 is a diagrammatic cross-sectional view of a tube illustrating airflow thereabout in accordance with the present invention;

The detailed description explains embodiments of the invention, together with advantages and features, by way of example with reference to the drawings.

DETAILED DESCRIPTION OF THE INVENTION

Figure 1:
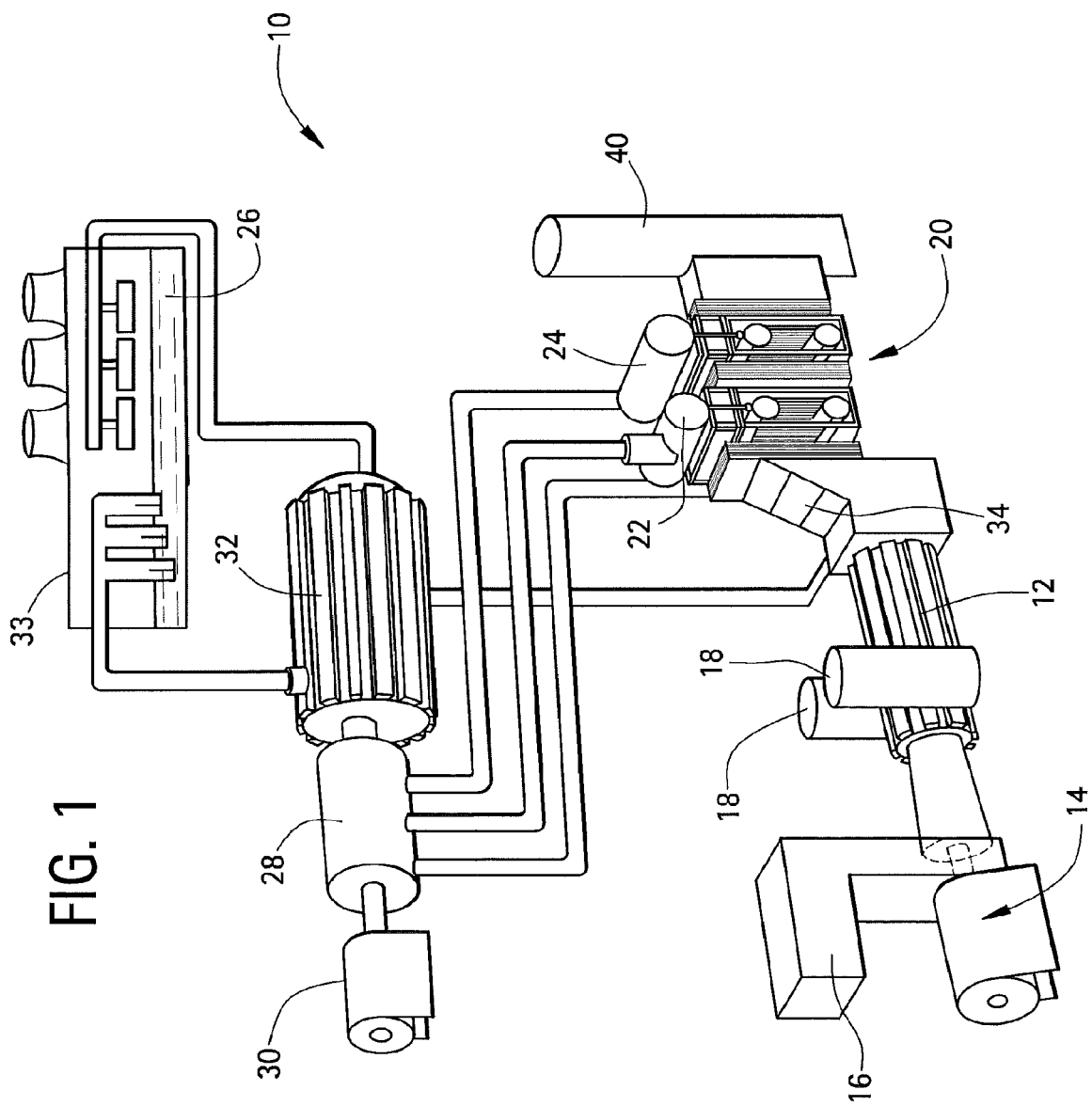
FIG. 1 is a schematic diagram of a combined cycle power plant.

Referring to FIG. 1 a combined cycle power plant is generally shown at 10. In a first cycle of the combined cycle power plant 10 a gas turbine 12 is connected to a generator 14 for generating electricity. Air is ingested into the gas turbine 12 through an air intake 16 and fuel is provided to the gas turbine at intakes 18. The fuel is burned to drive the gas turbine 12 and the resulting combustion gas is exhausted. The gas turbine 12 drives the generator 14, which generates the electricity. In a simple cycle power plant the hot exhaust gas would be lost, however in the combined cycle power plant 10 it is utilized to drive a second cycle.

In a second cycle of the combined cycle power plant 12 the hot exhaust gas is captured and directed into a heat recovery steam generator 20. The heat recovery steam generator 20 utilizes a high pass evaporator 22 and a low pass evaporator 24, which have a plurality of tubes (not shown) that are exposed to the hot exhaust gas from the gas turbine 12. Water is fed through the tubes, as is discussed below. The exhaust gas heats the tubes, which transfers the heat to the water causing the water to evaporate into steam. This steam is delivered to a steam turbine 28 to drive the steam turbine 28, which in-turn drives a generator 30 for generating electricity.

The steam passing through the steam turbine 28 is delivered to a steam condenser 32, where it is condensed back to water and delivered to a reservoir 26. The water at reservoir 26 is cooled by a cooling tower 33, with the cooled water being delivered to the steam condenser 32 to condense the steam back to the liquid state. Water at the steam condenser 32 is also delivered to the heat recovery steam generator 20 where it is fed through the tubes, this water is not cooled.

The heat recovery steam generator 20 has an intake duct 34 which receives exhaust gas from the gas turbine 12 and directs the exhaust gas into the high pass evaporator 22 and then the low pass evaporator 24. The evaporators include the tubes (not shown) for evaporating liquid water passing there through into steam. The exhausted gas is then vented to a stack 40.

Figure 2:
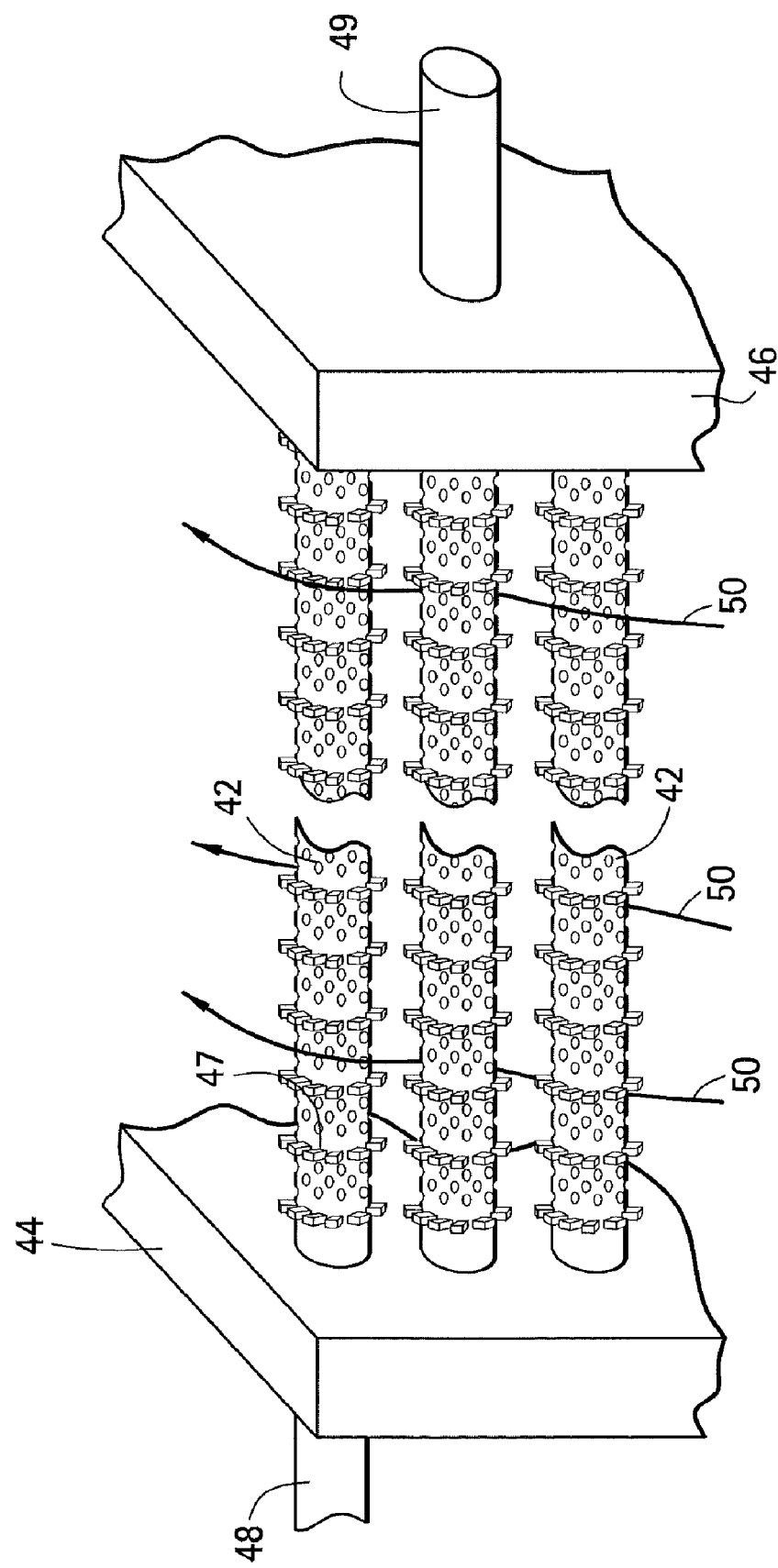
FIG. 2 is a perspective view of tubes in a heat recovery steam generator, the tubes being exposed to the gas turbine exhaust to transfer thermal energy from the gas turbine exhaust to water inside the tubes thereby generating steam.

Referring to FIG. 2, tubes 42 are arranged in an array between an intake manifold 44 and exit manifold 46. The tubes 42 each have a plurality of solid serrated fins 47 extending outwardly therefrom, which seek to promote heat transfer by simply increasing surface area. Liquid water is delivered to intake manifold 44 by a pipe 48 and is distributed to the tubes 42 by the manifold 44. Exhaust gas, as indicated by lines 50, passes around the tubes 42, whereby the tubes 42 are heated. Liquid water within tubes 42 when sufficiently heated produces steam, which enters the exit manifold 46 and exits the heat recovery steam generator 20 via a pipe 49. Improved heat transfer from the exhaust gas to the tubes 42 is desired. As mentioned above, the heat recovery steam generator 20 is a significant contributor to overall efficiency and cost of the combined cycle power plant 10. Overall heat transfer efficiency can be improved, whereby plant cost can be reduced.

Referring to FIG. 3, a tube 42' of the prior art is show, which has a generally smooth outer surface 52 and the aforementioned fins (not shown). The exhaust gas flow, illustrated by lines 54, is moving towards the tube 42', as it reaches the outer surface 52 of the tube 42' it comes into contact with a laminar boundary layer, designated 56. The laminar boundary layer 56 is the layer where the exhaust gas flow hits and follows the outer surface 52 of the tube 42' until the exhaust gas flow reaches a point of separation, designated 58. At which point the exhaust gas flow will continue along its path apart from the tube 42'. The exhaust gas flow will then produce a wake, designated 60, past the point of separation 58, which consists of vortexes 62. These vortexes 62 create a low-pressure zone within the wake 60 that is inefficient for heat transfer and a major contributor for pressure drop.

Referring now to FIG. 4, a tube 42" of the present invention is show. The tube 42" has a roughed outer surface 66 and the aforementioned fins (not shown). The roughed outer surface 66 is formed by deforming the outer surfaces with indentations or dimples 68. These deformations, i.e., indentations or dimples 68, may be configured in a pattern to achieve desired flow at the outer surface 66. The exhaust gas flow, illustrated by lines 70, is moving towards the tube 42", as it reaches the outer surface 66 of the tube 42" it comes into contact with a laminar boundary layer, designated 72. The laminar boundary layer 72 is the layer where the exhaust gas flow hits and follows the outer surface 66 of the tube 42" until the exhaust gas flow reaches a point of separation, designated 74. At which point the exhaust gas flow interacts with the deformations 68 introducing turbulence in the exhaust gas flow. The turbulence promotes a transition from the laminar boundary layer 72 to a turbulent boundary layer 76. The turbulent boundary layer 76 is an area oriented further back on the tube 42" from the point of initial exhaust gas flow contact. In the turbulent boundary layer 76 the deformations 68 create the turbulence, which helps the exhaust gas flow remain at the surface 66 of the tube 42". Thusly, preventing early separation as was seen in tube 42' of FIG. 3. The exhaust gas flow will continue along its path apart from the tube 42". The exhaust gas flow will then produce a wake, designated 78, past the point of separation 74, which consists of vortexes 80. This results in a low-pressure zone or area that is significantly smaller than the one created by the tube 42' of FIG. 3, which consequently results in a decrease in the pressure drop and a increase in heat transfer between the exhaust gas and the tube 42".

Figure 5:
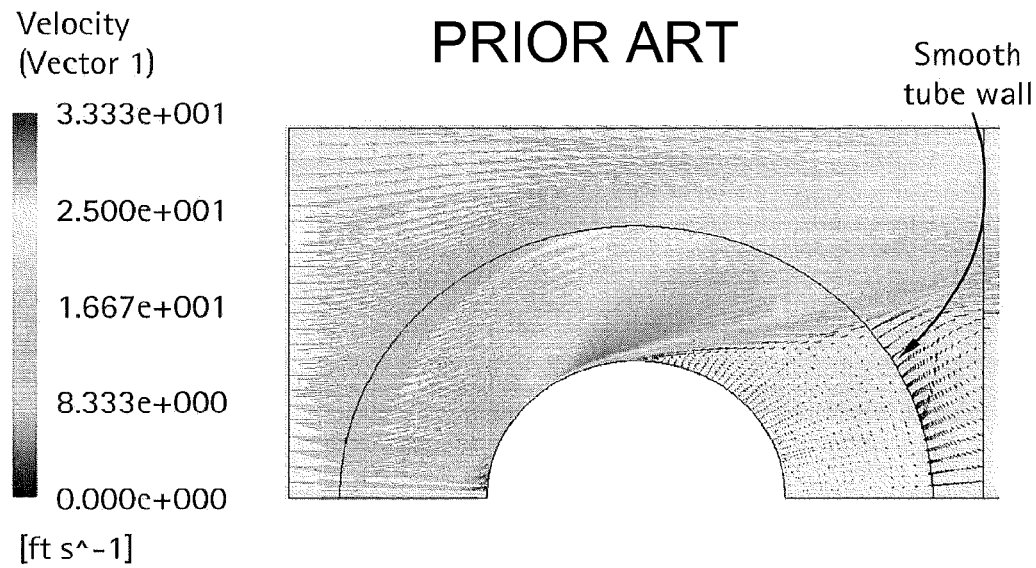
FIG. 5 is a velocity profile diagram of the airflow about the tube of FIG. 3.

Referring to FIG. 5 a velocity profile diagram of airflow about the tube 42' is shown. The velocity profile shows a high velocity vector at the outer surface 52 of tube 42', which is inefficient for heat transfer.

Figure 6:
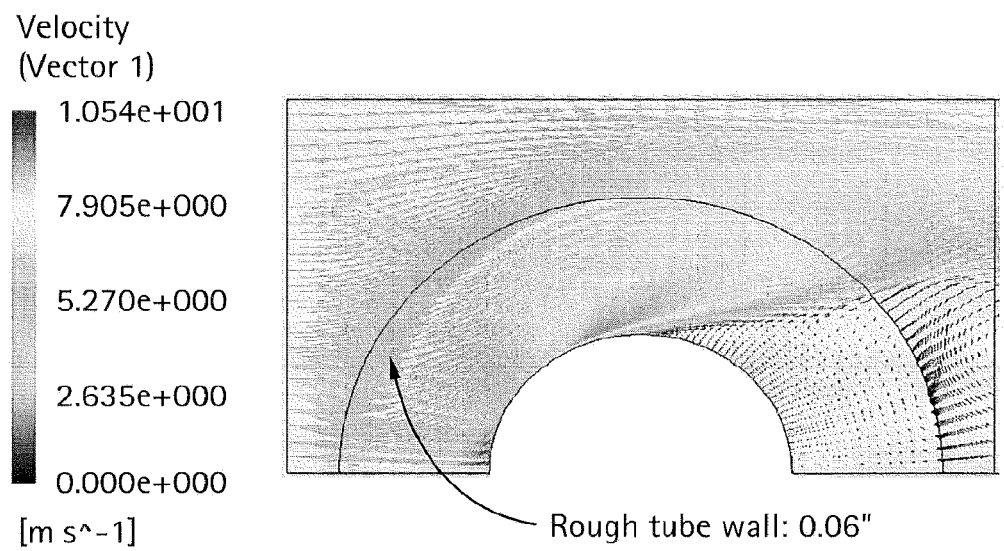
FIG. 6 is a velocity profile diagram of the airflow about the tube of FIG. 4.

Referring to FIG. 6 a velocity profile diagram of airflow about the tube 42" is shown. The velocity profile shows a significantly lower velocity vector, as compared to the velocity vector shown in FIG. 5, at the outer surface 52 of tube 42", which is more efficient for heat transfer.

Figure 7:
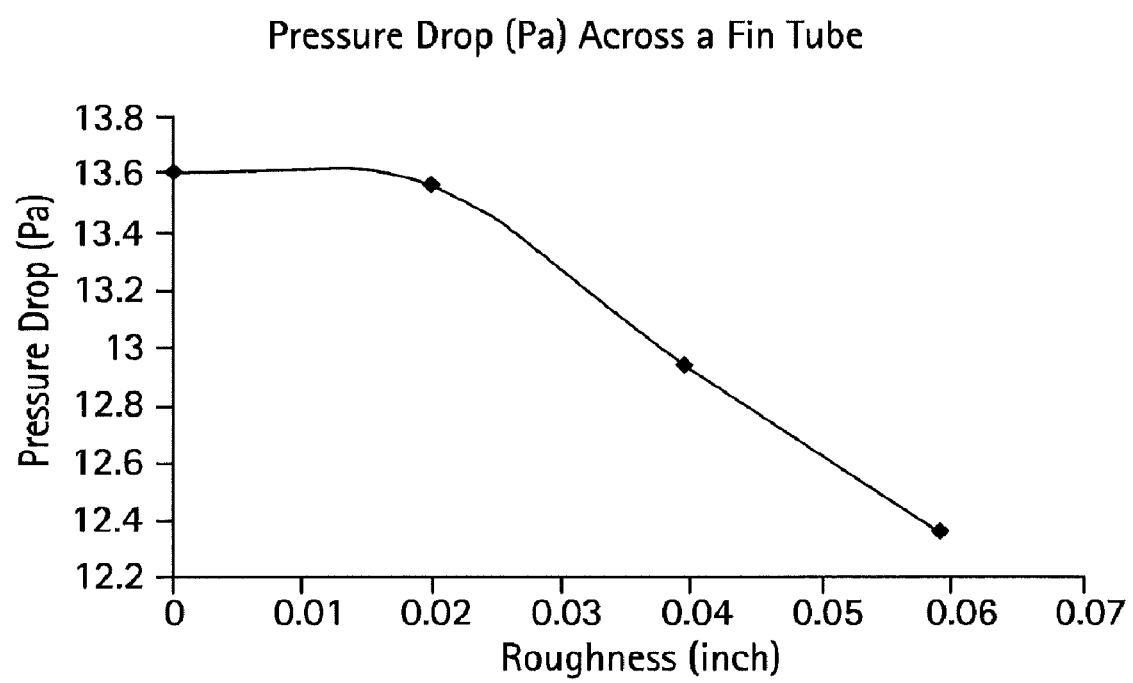
FIG. 7 is a plot of pressure drop reduction of the airflow about the tube of FIG. 4.

Referring now to FIG. 7 a plot of pressure drop reduction of the airflow about the tube 42" is generally shown, wherein the y-axis is Pressure Drop in Pascals and the x-axis is Roughness in inches. The slope of the line demonstrates that as the size of the deformations 68 increases there is a smaller pressure drop, which is favorable to the heat transfer between the exhaust gas and the tube 42", and, thusly the overall efficiency of the combined cycle power plant.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An evaporator of a heat recovery steam generator, the evaporator having at least one tube, the at least one tube having an outer surface defining a generally circular cross-section with a plurality of dimples formed therein sufficient to introduce turbulence in a flow of a gas in the heat recovery steam generator around the at least one tube for enhancing heat transfer from the gas to the at least one tube, the at least one tube including one or more fins projecting outward from the outer surface, the one or more fins being configured and disposed to further enhance heat transfer from the gas to the at least one tube, wherein the plurality of dimples are arranged in at least two rings that circumscribe the outer surface between adjacent ones of the one or more fins.

2. A construction method for an evaporator of a heat recovery steam generator, the evaporator having at least one tube, the construction method comprising:

forming a plurality of dimples in an outer surface defining a generally circular cross-section of the at least one tube sufficient to introduce turbulence in a flow of a gas in the heat recovery steam generator around the at least one tube for enhancing heat transfer from the gas to the at least one tube;

forming one or more fins on the outer surface to further enhance heat transfer from the gas to the at least one tube; and wherein the plurality of dimples is formed in at least two rings that circumscribe the outer surface between adjacent ones of the one or more fins.

3. A combined cycle power plant comprising;

a gas turbine;

a first generator driven by the gas turbine for generating electricity, wherein during operation of the gas turbine exhaust gas is generated;

a heat recovery steam generator disposed to receive the exhaust gas from the gas turbine, the heat recovery steam generator including an evaporator having at least one tube receptive to water flow there through, the at least one tube disposed to be exposed to the exhaust gas, wherein a flow of the exhaust gas passes around the at least one tube to transfer heat from the exhaust gas to the at least one tube and thereby the water flowing through the at least one tube sufficient for the water to evaporate into steam, the at least one tube having an outer surface defining a generally circular cross-section with a plurality of dimples formed therein sufficient to introduce turbulence in the flow of the exhaust gas for enhancing heat transfer from the exhaust gas to the at least one tube, the at least one tube including one or more fins projecting outward from the outer surface, the one or more fins being configured and disposed to further enhance heat transfer from the gas to the at least one tube, wherein the plurality of dimples is arranged in at least two rings that circumscribe the outer surface between adjacent ones of the one or more fins;

a steam turbine receptive to the steam from the heat recovery steam generator for driving the steam turbine; and a second generator driven by the steam turbine for generating electricity.

4. The combined cycle power plant of claim 3 wherein the at least one tube comprises a plurality of tubes arranged between an intake manifold and exit manifold.

* * * * *